(12) United States Patent
Pratt

(10) Patent No.: US 9,037,414 B1
(45) Date of Patent: May 19, 2015

(54) METHODS AND APPARATUS FOR ELECTROMAGNETIC SIGNAL POLARIMETRY SENSING

(75) Inventor: Thomas G. Pratt, Niles, MI (US)

(73) Assignee: University of Notre Dame du Lac, Notre Dame, IN (US)

( * ) Notice: Subject to any disclaimer, the term of this patent is extended or adjusted under 35 U.S.C. 154(b) by 617 days.

(21) Appl. No.: 13/349,968

(22) Filed: Jan. 13, 2012

Related U.S. Application Data

(60) Provisional application No. 61/461,220, filed on Jan. 14, 2011, provisional application No. 61/520,321, filed on Jun. 8, 2011.

(51) Int. Cl.
*G01S 13/00* (2006.01)
*G01S 7/02* (2006.01)
*G01S 7/282* (2006.01)
*G01S 7/38* (2006.01)
G01S 13/02 (2006.01)
G01S 13/88 (2006.01)
G01S 13/89 (2006.01)
G01S 13/36 (2006.01)

(52) U.S. Cl.
CPC ............... *G01S 7/024* (2013.01); *G01S 7/282* (2013.01); *G01S 13/0209* (2013.01); *G01S 13/885* (2013.01); *G01S 13/89* (2013.01); *G01S 13/36* (2013.01); *G01S 7/38* (2013.01)

(58) Field of Classification Search
CPC .......... G01S 7/024; G01S 7/282; G01S 7/38; G01S 13/0209; G01S 13/885; G01S 13/36; F41H 11/12; G01V 3/12

USPC .......... 702/2; 342/22; 356/73.1; 455/73, 118, 455/190.1
See application file for complete search history.

(56) References Cited

U.S. PATENT DOCUMENTS

| | | | | |
|---|---|---|---|---|
| 5,557,277 | A * | 9/1996 | Tricoles et al. | 342/22 |
| 6,501,414 | B2 * | 12/2002 | Arndt et al. | 342/22 |
| 6,608,587 | B1 * | 8/2003 | Sparrow et al. | 342/188 |
| 6,850,318 | B1 * | 2/2005 | Ito et al. | 356/73.1 |
| 7,024,058 | B2 * | 4/2006 | Han et al. | 385/11 |
| 8,229,302 | B2 * | 7/2012 | Von Der Weid | 398/147 |
| 8,417,192 | B2 * | 4/2013 | Brady et al. | 455/73 |
| 8,553,804 | B2 * | 10/2013 | Siwiak et al. | 375/299 |
| 8,655,193 | B2 * | 2/2014 | Kikuchi | 398/208 |
| 2006/0008022 | A1 | 1/2006 | Wight | |
| 2008/0129594 | A1 * | 6/2008 | Pera et al. | 342/361 |
| 2009/0190930 | A1 * | 7/2009 | Von Der Weid | 398/81 |
| 2010/0003034 | A1 * | 1/2010 | Pratt et al. | 398/152 |
| 2010/0286152 | A1 * | 11/2010 | Bernasconi et al. | 514/249 |
| 2012/0236954 | A1 * | 9/2012 | Siwiak et al. | 375/267 |
| 2013/0016418 | A1 * | 1/2013 | Chen et al. | 359/279 |

FOREIGN PATENT DOCUMENTS

JP 2003294580 A * 10/2003
WO 2008/121433 A3 10/2008

* cited by examiner

*Primary Examiner* — Carol S Tsai
(74) *Attorney, Agent, or Firm* — Greenberg Traurig, LLP

(57) ABSTRACT

A system and method of identifying changes utilizing radio frequency polarization includes receiving a reflected and/or transmitted polarized radio frequency signal at a receiver, filtering, amplifying and conditioning the received signal, converting the received signal from an analog format to a digital format, processing the digital signal to elicit a polarization mode dispersion feature of the received signal, and comparing the polarization mode dispersion features to a known calibration to detect a change in a characteristic of the target object.

26 Claims, 5 Drawing Sheets

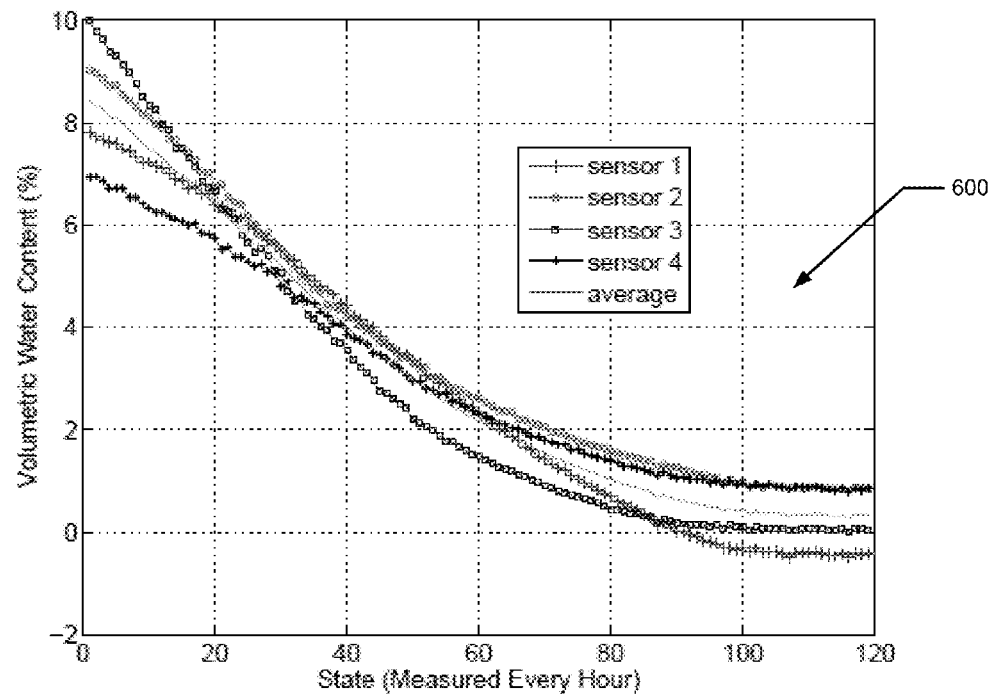
FIG. 6
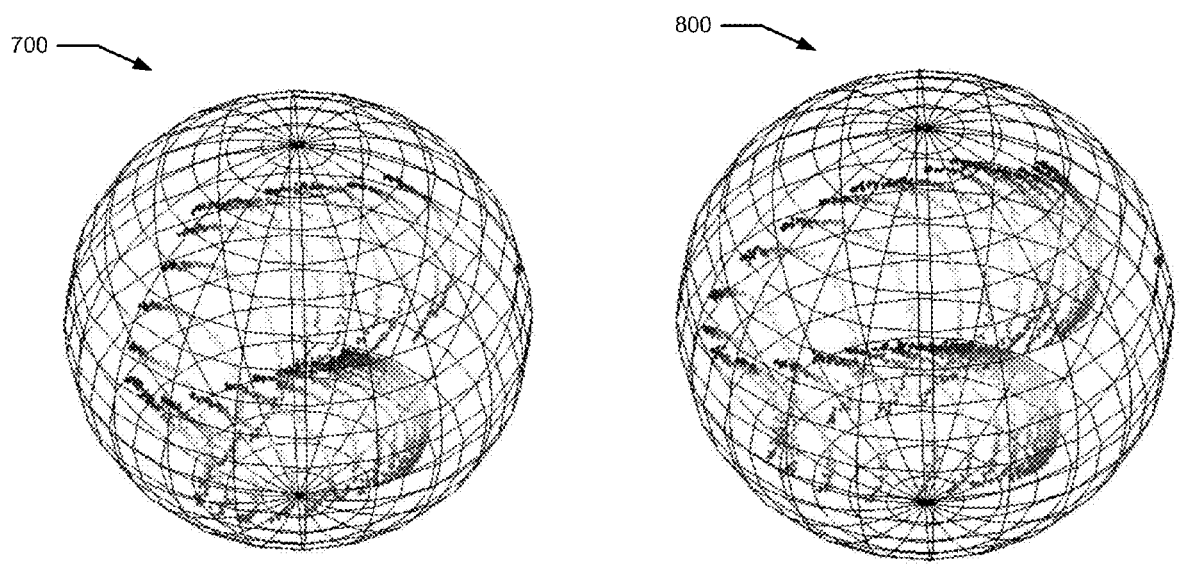
FIG. 7
FIG. 8

METHODS AND APPARATUS FOR ELECTROMAGNETIC SIGNAL POLARIMETRY SENSING

CROSS REFERENCE TO RELATED APPLICATION

This application is a non-provisional application claiming priority from U.S. Provisional Application Ser. No. 61/461,220, filed Jan. 14, 2011, entitled "Method and Apparatus for Soil Moisture Sensing," and U.S. Provisional Application Ser. No. 61/520,321, filed Jun. 8, 2011, entitled "Method and Apparatus for Soil Moisture Sensing," both of which are incorporated herein by reference in their entirety.

FIELD OF THE DISCLOSURE

The present description relates generally to electromagnetic signal sensing and more to methods and apparatus for electromagnetic polarimetry sensing.

BACKGROUND OF RELATED ART

Estimation of spatial and/or temporal variation in soil moisture is typically an important parameter in a number of applications ranging from efficiency of agricultural practices, to estimation of recharge to groundwater systems for modeling studies, to estimation of slope stabilities following precipitation, to monitoring the impact of mining operations. Such variation can be related to a number of interacting processes including heterogeneity of the sediments, spatial variation in recharge (related to spatial variation in precipitation, leaks in surface or buried pipelines, and vegetation), and spatial variation in evapotranspiration. Measurement of soil moisture is therefore an important challenge in a number of modeling and field optimization processes; a challenge which has attracted attention from the early days of technical research on the vadose zone to a plethora of journal articles focused on this soil property.

A number of methods have been developed to measure soil moisture either locally (e.g., at the meter scale or smaller) through direct or indirect measures on local sediments or at larger scales (10's of meters to watershed scale) through remote imaging. Briefly, local measures have been based predominantly on capacitance or resistance measures in soils, including time domain reflectometry (TDR), frequency domain reflectometry (FDR), and soil block measurements. To a lesser degree, soil tensiometers have been used to measure pore water pressure and this pressure has, through calibration of the pressure-moisture relationship, been related to soil moisture. These tools provide for measuring soil moisture at short time intervals with a support volume of the measurement on the order of the probe (e.g., soil blocks) to several multiples of the size of the probe (e.g., TDR and FDR) used in the measurement. As such, relatively precise measurement can be made, but field scale characterization of the spatial distribution of soil moisture would require a large number of probes.

In contrast, a number of imaging methods have been applied to measurement of the spatial distribution of soil moisture at scales ranging from agricultural fields to watersheds. Principal among these in the recent literature have been satellite imagery, thermal inertia methods, and assimilation of microwave signals. These methods have generally provided the ability to monitor the spatial distribution of soil moisture, but are limited spatially and temporally to locations where remotely sensed images are available (particularly for the satellite and temperature methods). Further, the spatial resolution is typically constrained by available storage/pixel dimensions.

Comparison of these two ranges of instruments (local versus large-scale) provides insight into a portion of the difficulty in integrating data over multiple scales of characterization with modeling efforts. Hence, the potential of remote measurement of soil moisture using available WLAN signals provides multiple advantages, including extremely low cost measurement with almost ubiquitous coverage in populated regions. Further, in light of the discussion above, WLAN networks also provide the promise of providing estimates of soil moisture over different averaging areas (averaging volumes) through judicious selection of beacon and receiver locations.

To date, radio frequency (RF) characterization of soil moisture has largely been associated with large-area characterizations using aerial reconnaissance and/or satellite observations. These approaches are constrained by limited earth coverage, low revisit times, and high cost, and do not offer flexibility to achieve customized monitoring architectures for smaller-scale applications. As one illustration, the Soil Moisture Active Passive (SMAP) Mission sensor estimates soil moisture at resolutions of 10 km with revisit intervals of 2 to 3 days. Such spatial and temporal resolutions are not well suited to address soil-moisture monitoring in low-cost field-scale applications requiring high revisit rates. Some experimentation has been performed using either active or passive ground-based RF systems. Active ground-based systems, mainly SAR systems, have been used for radar imaging of terrain and other applications including interferometric monitoring of large man-made structures. Most of the experimental systems described in literature are active systems with a Vector Network Analyzer (VNA) to perform a stepped frequency construction of a wide-band signal for high range resolution. Among the ground-based passive systems, a microwave radiometer has been used to infer soil moisture from polarization component magnitudes using non-coherent detection of ambient reflected microwaves over small areas for assimilation into precipitation models. A different passive ground based sensing approach employs an in-situ GPS receiver for near surface soil measurements. This sensing method exploits signals from the GPS constellation and measures SNR variations induced by satellite motion to infer soil moisture levels through subsequent model simulation. The technique reportedly offers resolutions on the order of 300 square meters, but the technique requires an in-situ receiver, relies on approximately 45 minutes of satellite motion to generate a useful output, assumes a single dominant multipath component and knowledge of various environmental parameters, and suffers from a relative lack of control over the transmitter/receiver geometry and corresponding sensing resolution.

The goal of known irrigation management techniques is to achieve an optimum water supply for crop productivity. Escalating worldwide water shortages and irrigation costs have resulted in an increasing emphasis on developing irrigation techniques that minimize water use while maintaining productivity (i.e. maximize water use efficiency). Irrigation scheduling techniques that are based on plant or soil water status can help achieve this goal. The advantage of soil moisture measurements over plant water status is that soil moisture measurements can be used to determine the amount of water that needs to be applied, while plant measurements merely indicate when water is needed, but not how much. In addition, soil moisture measurements can be easily integrated into automated systems. Conventional soil moisture monitoring techniques such as dielectric or resistance measurements in soils can be unwieldy in field-scale applications due to the need for contact with the soil and the large number of sensors required for suitable coverage.

Remote sensing approaches have advantages because of their capacity to integrate over large areas. Technologies such as aerial reconnaissance and/or satellite observations are widely used for large-area characterizations. However, these approaches are oftentimes constrained by limited earth coverage, low revisit times, low resolution, high cost, and do not offer flexibility to achieve customized monitoring for variable-scale applications.

BRIEF DESCRIPTION OF THE DRAWINGS

FIG. 6 is an example plot showing calibrated moisture estimates at hourly intervals synchronized to the radio frequency data collected by the example system of FIG. 2.

FIG. 7 is an example illustration of various polarization signatures for one example use of the system of FIG. 2.

FIG. 8 is an example illustration of various polarization signatures for another example use of the system of FIG. 2.

DETAILED DESCRIPTION

Figure 1:
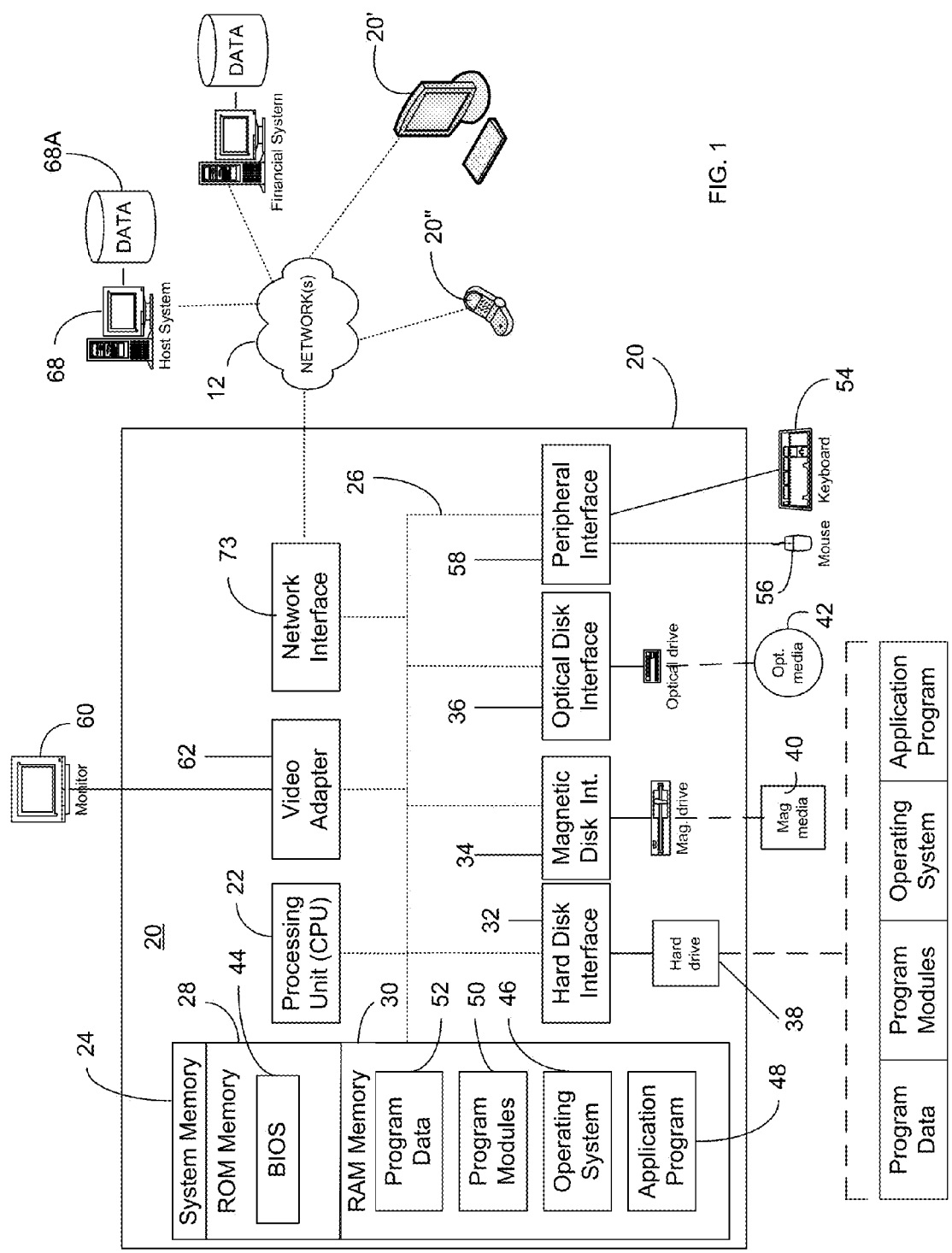
FIG. 1 illustrates in block diagram form components of an example, computer environment suitable for implementing the example methods and apparatus for radio frequency polarimetry sensing.

The following description of example methods and apparatus is not intended to limit the scope of the description to the precise form or forms detailed herein. Instead the following description is intended to be illustrative so that others may follow its teachings.

In contrast to the aforementioned remote ground-based techniques, the present disclosure describes a passive, coherent polarimetric soil moisture sensing concept. The example approach is designed to detect changes in bistatic scattering behavior from upper layers of the ground between local WLAN access points and the sensor. The method represents a highly portable, flexible, low-cost method that also provides some control over resolution scales via the antenna characteristics and deployment geometry between the transmitter, the receiver, and the ground to be monitored. Once installed, the system provides a low-cost continuous automated monitoring capability with easy access to data products. The disclosed approach may provide an advantage over the conventional satellite sensors exist in term of cost, cell resolution, revisit rates, persistence, ease of data retrieval, accuracy, ease of installation, and/or system portability.

There is a great need for remote sensing techniques as disclosed. For example, in an agricultural application, the present disclosure can provide scalable, low-cost, continuous monitoring of soil moisture. In particular, the present disclosure can enable improved irrigation practices to optimize crop growth and increase water use efficiency. For instance, a soil moisture sensing technology constructed in accordance with the teachings of the present disclosure operates by measuring polarimetric properties of bistatic clutter returns from the ground between a radio frequency (RF) transmitter and the receiver/sensor to detect changes in the reflected radio signal induced by changing soil moisture levels.

For instance in one example, a soil moisture sensor is capable of detecting and quantifying soil moisture under agricultural conditions. Additionally, the example is capable of identifying "drought triggers" by examining changes in the RF signal related to crop growth and physiology. Finally, the example soil moisture sensor technology may be utilized to replace relatively expensive instrumentation typically used for current methods.

To accomplish at least some of these features, the present disclosure may be utilized in various fields including, for example, in agricultural environments to detect, based upon RF-based polarimetry, changes in soil moisture in fallow fields and/or fields with crops. The sensors may be calibrated to obtain quantitative soil moisture estimates. At the same time crop growth and physiology can be monitored to correlate the measurements to the polarimetric measurements. The present example may also be utilized to determine the soil moisture profile versus depth by leveraging responses from different transmit frequencies, where lower frequencies provide increased penetration depths. The present RF polarimetric technology can thus impact horticultural and agricultural production.

With reference to the figures, the following discloses various example systems and methods for RF polarimetric sensing including, for instance, soil moisture detection. To this end, FIG. 1 illustrates a processing device 20", illustrated in the exemplary form of a mobile communication device, a processing device 20', illustrated in the exemplary form of a computer system, and a processing device 20 illustrated in schematic form, such as for example, a home computer, each of which may be provided with executable instructions to, for example, provide a means for a customer, e.g., an end user, representative, consumer, etc., to interact with the device 20 and/or to access a host system server 68. Generally, the computer executable instructions reside in program modules which may include routines, programs, objects, components, data structures, etc. that perform particular tasks or implement particular abstract data types. Accordingly, those of ordinary skill in the art will appreciate that the processing devices 20, 20', 20" illustrated in FIG. 1 may be embodied in any device having the ability to execute instructions such as, by way of example, an appliance, a personal computer, mainframe computer, personal-digital assistant ("PDA"), cellular telephone, tablet, ereader, or the like. Furthermore, while described and illustrated in the context of a single processing device 20, 20', 20" those of ordinary skill in the art will also appreciate that the various tasks described hereinafter may be practiced in a distributed environment having multiple processing devices linked via a local and/or wide-area network whereby the executable instructions may be associated with and/or executed by one or more of multiple processing devices. Still further, while described and illustrated in the context of a networked system, it will be understood that various portions of the present disclosure may be integrated into a single stand-alone environment.

For performing the various tasks in accordance with the executable instructions, the example processing device 20 includes a processing unit 22 and a system memory 24 which may be linked via a bus 26. Without limitation, the bus 26 may be a memory bus, a peripheral bus, and/or a local bus using any of a variety of bus architectures. As needed for any particular purpose, the system memory 24 may include read only memory (ROM) 28 and/or random access memory (RAM) 30. Additional memory devices may also be made accessible to the processing device 20 by means of, for example, a hard disk drive interface 32, a magnetic disk drive interface 34, and/or an optical disk drive interface 36. As will be understood, these devices, which would be linked to the system bus 26, respectively allow for reading from and writing to a hard disk 38, reading from or writing to a removable magnetic disk 40, and for reading from or writing to a removable optical disk 42, such as a CD/DVD ROM or other optical media. The drive interfaces and their associated computer-readable media allow for the nonvolatile storage of computer readable instructions, data structures, program modules and other data for the processing device 20. Those of ordinary skill in the art will further appreciate that other types of non-transitory computer readable media that can store data and/or instructions may be used for this same purpose. Examples of such media devices include, but are not limited to, magnetic cassettes, flash memory cards, digital videodisks, Bernoulli cartridges, random access memories, nano-drives, memory sticks, and other read/write and/or read-only memories.

A number of program modules may be stored in one or more of the memory/media devices. For example, a basic input/output system (BIOS) 44, containing the basic routines that help to transfer information between elements within the processing device 20, such as during start-up, may be stored in ROM 28. Similarly, the RAM 30, hard drive 38, and/or peripheral memory devices may be used to store computer executable instructions comprising an operating system 46, one or more applications programs 48 (such as a Web browser), other program modules 50, and/or program data 52. Still further, computer-executable instructions may be downloaded to one or more of the computing devices as needed, for example via a network connection.

To allow a user to enter commands and information into the processing device 20, input devices such as a keyboard 54 and/or a pointing device 56 are provided. While not illustrated, other input devices may include a microphone, a joystick, a game pad, a scanner, a camera, touchpad, touch screen, motion sensor, etc. These and other input devices would typically be connected to the processing unit 22 by means of an interface 58 which, in turn, would be coupled to the bus 26. Input devices may be connected to the processor 22 using interfaces such as, for example, a parallel port, game port, firewire, or a universal serial bus (USB). To view information from the processing device 20, a monitor 60 or other type of display device may also be connected to the bus 26 via an interface, such as a video adapter 62. In addition to the monitor 60, the processing device 20 may also include other peripheral output devices, not shown, such as, for example, speakers, cameras, printers, or other suitable device.

As noted, the processing device 20 may also utilize logical connections to one or more remote processing devices, such as the host system server 68 having associated data repository 68A. In this example, the server 68 may act as a processor as described herein. In this regard, while the host system server 68 has been illustrated in the exemplary form of a computer, it will be appreciated that the host system server 68 may, like processing device 20, be any type of device having processing capabilities. Again, it will be appreciated that the host system server 68 need not be implemented as a single device but may be implemented in a manner such that the tasks performed by the host system server 68 are distributed amongst a plurality of processing devices/databases located at different geographical locations and linked through a communication network. Additionally, the host system server 68 may have logical connections to other third party systems via a network 12, such as, for example, the Internet, LAN, MAN, WAN, cellular network, cloud network, enterprise network, virtual private network, wired and/or wireless network, or other suitable network, and via such connections, will be associated with data repositories that are associated with such other third party systems. Such third party systems may include, without limitation, systems of banking, credit, or other financial institutions, systems of third party providers of goods and/or services (e.g., inventory), systems of shipping/delivery companies, etc.

For performing tasks as needed, the host system server 68 may include many or all of the elements described above relative to the processing device 20. Communications between the processing device 20 and the host system server 68 may be exchanged via a further processing device, such as a network router (not shown), that is responsible for network routing. Communications with the network router may be performed via a network interface component 73. Thus, within such a networked environment, e.g., the Internet, World Wide Web, LAN, cloud, or other like type of wired or wireless network, it will be appreciated that program modules depicted relative to the processing device 20, or portions thereof, may be stored in the non-transitory memory storage device(s) of the host system server 68.

Figure 2:
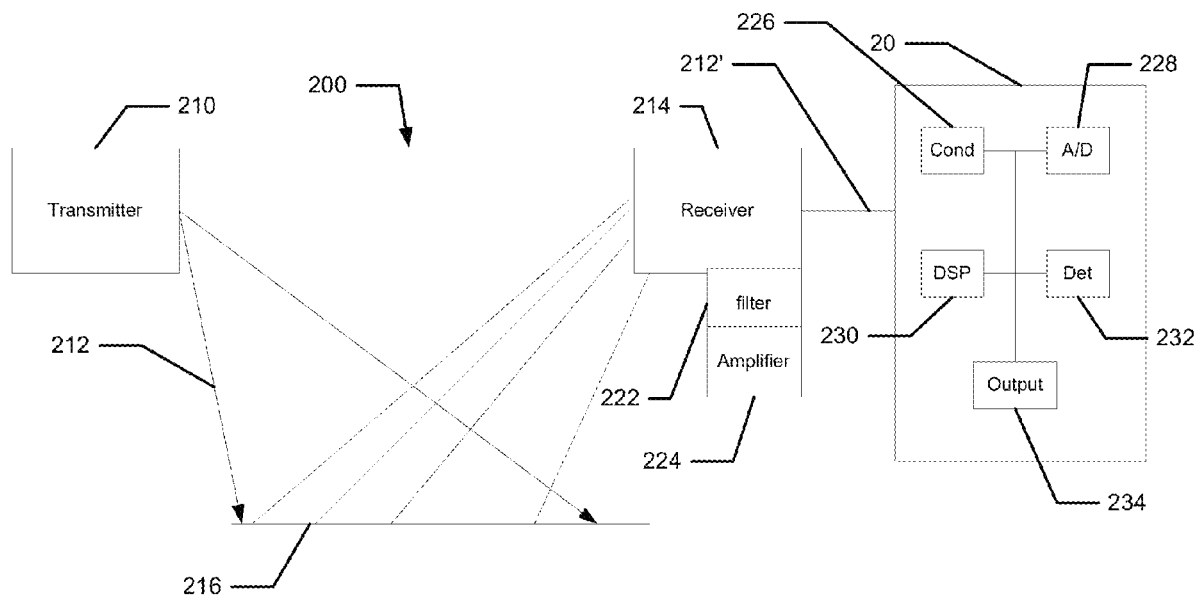
FIG. 2 illustrates an example radio frequency polarimetry sensing system in accordance with the teachings of the present disclosure.

Referring now to FIG. 2, an example sensor system 200 configuration is illustrated. In the illustrated example, a transmitter 210 is configured to actively transmit an electromagnetic signal, such as for example, a radio frequency signal 212. The electromagnetic signal 212 may be any type of electromagnetic signal including at least one of a radio frequency signal, a microwave signal, an infrared signal, a visible light signal, an ultraviolet radiation signal, an X-ray signal, or a gamma ray signal. A receiver 214 is positioned to receive the transmitted signal 212 reflected by a target object 216. The receiver 214, in turn may be communicatively coupled to the processing device 20 to perform the RF polarimetric processing. In one example, the receiver 214 relies on the propagation of beacon transmissions from the transmitter 210, which in this example is a WLAN access point. The example access point transmits a beacon pulse approximately every 100 ms. The transmit signal 212 energy is reflected by the target object 216, such as for example, the ground (including sublayers) residing in the local environment. The reflected signals 212 will generally have different path delays and will exhibit different scattering characteristics in amplitude and in polarimetric response that will depend upon the reflecting medium. The receiver 214 collects energy that is reflected by the object 216 to be characterized. Other signals, such as line-of sight (LOS) components from the transmitter, and also undesired multipath reflections from nearby objects may also be simultaneously present at the receiver. LOS signals are typically unreflected, although in the instance where the target 216 is transmissive, the LOS signals may be impacted. Thus, the polarization sate of these signals are usually not affected like the signals that are reflected off the target 216. Accordingly, in one example the polarization state of these LOS signals can be compare with the polarization state of signals reflected off the target 216.

While the present example is disclosed and illustrated as a bistatic system, it will be appreciated that the system 200 may be configured as a monostatic system as desired. Still further, the system 200 need not rely upon a reflection of the signal 212 off of the target object 216, but rather may additionally or alternatively utilize transmission of the signal 212 through the object 216 such as, for example, fog or other hydrometeor target. Additionally, the system 200 may be utilized to detect properties of the targets 216 in other mediums such as, for instance, any electromagnetic propagation medium that supports multiple modes and exhibits dispersion, such as power transmission lines, optical fiber, free space optics, RF, etc.

In conventional receivers, multipath components that are not reflected from the target are usually regarded as unwanted signal components and detrimental because they mask the clutter returns of interest. In the sensor system 200, however, mitigation of these undesired signal components is not essential due to the fact that these components are generally coherent with the clutter (i.e., they are delayed copies of each other), and hence the polarimetric features of the received signal can still be utilized to sense the desired clutter in the presence of these undesired signal components. Because the system 200 can operate in the presence of a strong line-of-sight (LOS) component and unwanted multipath components, it is a uniquely robust sensor for change detection. The system 200 can also operate in co-channel interference from other wireless systems through excision of beacon pulses that are corrupted by interference. These pulses are discarded instead of being used by the system 200 in the integration processing. Uncorrupted pulses are integrated to obtain high signal-to-noise ratio characterizations of the polarization signatures of the composite signal to increase the system's fidelity.

As noted, the system 200 includes the RF transmitter 210 and a receiver 214 deployed so that the target 216 (e.g., the ground) to be sensed lies in at least one transmission path between the transmitter 210 and the receiver 214 as shown in FIG. 1. The antenna heights, separations, and antenna characteristics are chosen depending upon the scale of the particular application. Qualitatively, the example system 200 operates in the following manner: the transmitter 210 emits RF pulses and/or continuous signals (e.g., signals 212). These pulse signals 212 are reflected by reflectors (e.g. targets) in the environment, including, for example, the ground being sensed. The collection of multipath components arrive at the receiver 214, where in this example dual-polarized antennas capture orthogonally-polarized components of the signal 212 incident at the receive antennas. The processing device 20 processes the captured signals 212 by digitized the data and operating digital signal processing algorithms to estimate the polarization response induced by the transmitted signal 212 in conjunction with the multipath signals as be described.

In particular, the example receiver 214 and processing device 20 together include a low noise amplifier 222, and an RF filter 224 to produce a filtered and amplified signal 212'. The filter and amplified signal 212' is then processed through an analog signal conditioner 226, where the signal is mixed to a low IF and then filtered. The signal is then converted from an analog format to a digital format at the A/D converter 228. A digital signal processor 230 is then utilized to elicit polarization mode dispersion (PMD) features of the received signal.

Specifically, in one disclosed example, the digital signal processor 230 receives a channel-impaired version of a known signal, or a signal with a known preamble or training symbols. The vertical and horizontal components are measured for signal quality to determine if the signal is corrupted (e.g., by interference), and if so the received block is excised from further processing. If the signal is not corrupted, the digital signal processor 230 then performs channel estimation on a subcarrier-by-subcarrier basis and computes the Stokes parameters versus the frequency index k. It will be understood by one of ordinary skill in the art that other processing parameters may be utilized including, for example, excision, filtering, compensation, statistical characterizations, and/or the application of other signal processing algorithms such as Jones vectors.

In another disclosed example, the digital signal processor 230 receives a channel-impaired version of an unknown signal that does not have a known preamble or training sequence. In this instance, the vertical and horizontal components are similarly measured for signal quality to determine if the signal is corrupted (e.g., by interference), and if so the received block is excised from further processing. If the signal is not corrupted, the digital signal processor then forms a covariance estimate and utilizes the result to compute the Stokes parameters versus the frequency index k. In instances where the signal to noise ratio is low, the digital signal processor 230 may use integration where possible to improve the PMD estimate quality.

The estimated PMD signatures are then stored by the processing device 20 and PMD responses from multiple receivers, multiple frequencies, multiple polarization, multiple times, multiple sectors, multiple beams, etc., may be collected to aid in calibration and in the final detection processing. Calibration signals may alternatively be predetermined and provided to the processing device through any suitable means, including, for instance, in a download available through the network 12. The detected PMD signals are then interpreted by a detector 232 via comparison of the detected signal with known calibration data and/or previous measurements, to obtain a detected output.

In at least one example, the detector 232 may compensate for external factors before and/or during interpretation of the PMD signatures. For instance, the polarimetric response of moist soil may change with such external factors as temperature, etc. By measuring these factors (e.g. temperature), the detector 232 may compensate for variations in the external factor. Once interpreted, the results are then output through an output 234, such as the display 60, for reporting and/or any other suitable purpose. Still further, while the present example is disclosed in conjunction with calibration signals, it will be appreciated by one of ordinary skill in the art that the interpretation and/or comparison by the system 200 may be performed by comparing responses from different times, frequencies, beams, sectors, transmitters, receivers, and/or transmit polarizations, etc. to interpret the PMD responses.

In this example where the system 200 is utilized for soil moisture sensing, as the soil moisture varies, the dielectric properties of the soil change, which alters the magnitude and phase of the reflected ground signals, ultimately modifying the polarization behavior of the received signal as a function of frequency. The polarization-frequency response evolves through a continuum of states as the soil moisture changes, leading to polarization-frequency "signatures" that can be interpreted with site specific RF calibration to estimate soil moisture levels.

More particularly, the RF transmitter 210 emits the radio frequency signal 212 as represented by the phasor (Eq. 1):

$$u(t)=A(t)e^{j\omega t} \qquad \text{Eq. 1}$$

which is a time varying signal modulated onto a carrier at frequency $\omega=2\pi f$, where t represents time, $j=\sqrt{-1}$ and $A(t)$ is the complex envelope of the signal having a bandwidth B. This signal propagates through a channel composed of various multipath reflectors with polarization-diverse scattering. The channel, designated by the polarization vector channel $\underline{h}(t,\omega)$, can be represented as a tap-delay filter for each polarization basis component, and the received signal for each polarization basis component is the sum of delayed and scaled versions of the transmitted signal, where the tap delay filter coefficients will, in general, be different for the two orthogonally-polarized received signal components (Eq. 2):

$$h(t, \omega) = \begin{bmatrix} h^v(t, \omega) \\ h^w(t, \omega) \end{bmatrix} = \begin{bmatrix} \sum_{n=1}^{N} h_n^v \delta(t - \tau_n) e^{j\omega\tau_n} \\ \sum_{n=1}^{N} h_n^w \delta(t - \tau_n) e^{j\omega\tau_n} \end{bmatrix} \quad \text{Eq. 2}$$

where N is the number of multipaths, $\tau_n$ is the path delay associated with path n, and $\delta(t)$ represents the Dirac impulse function. Using a frequency-domain representation obtained from use of the fast-Fourier transform, the received signal at frequency subband k is $\underline{X}_k = [X_k^v X_k^w]^T = \underline{H}_k \underline{U}_k$, where U, $\underline{H}$, and $\underline{X}$ correspond to the frequency-domain versions of the transmitted signal, the vector channel response, and the received signal vector, respectively. The subscript k corresponds to the frequency subband and the superscripts correspond to the received orthogonally-polarized basis components (e.g., vertical and horizontal polarization).

With the frequency domain representations of the two received orthogonally-polarized components, it is possible to characterize the polarization-frequency behavior through use of Stokes parameters. The Stokes vector for the signal component at subcarrier k, $\underline{S}_v(k)$ may be obtained from the coherency matrix (Eq. 3, Eq. 4)

$$J(k) = \begin{bmatrix} j_{11}(k) & j_{12}(k) \\ j_{21}(k) & j_{22}(k) \end{bmatrix} = E[X_k X_k^h] \quad \text{Eq. 3}$$

using $$\underline{S}_v(k) = \begin{bmatrix} j_{11}(k) + j_{22}(k) \\ j_{11}(k) - j_{22}(k) \\ j_{12}(k) j_{21}^*(k) + j_{21}(k) j_{12}^*(k) \\ j_{12}(k) j_{21}^*(k) - j_{21}(k) j_{12}^*(k) \end{bmatrix} \quad \text{Eq. 4}$$

The response given by the collection of subcarrier channel responses defines the polarization mode dispersion (PMD) response of the channel for the given transmit polarization. We designate this PMD trajectory as the set (Eq. 5)

$$\Gamma_x = \{\underline{S}: \underline{S} \in \underline{S}_v(k), k \in \{0,1,\ldots,K-1\}\} \quad \text{Eq. 5}$$

The members in this set are the collection of the output polarization states $\underline{S}_v(k)$ for all subcarriers $k \in \{1, 2, \ldots, K\}$, and the set defines the polarization response induced by the combination of the transmitter and the channel effects. It is this signature that is used for sensing. RF calibration is used to assign soil moisture states to each "signature," to enable translation of the received polarimetric signatures to an estimate of the soil moisture level.

Figure 3:
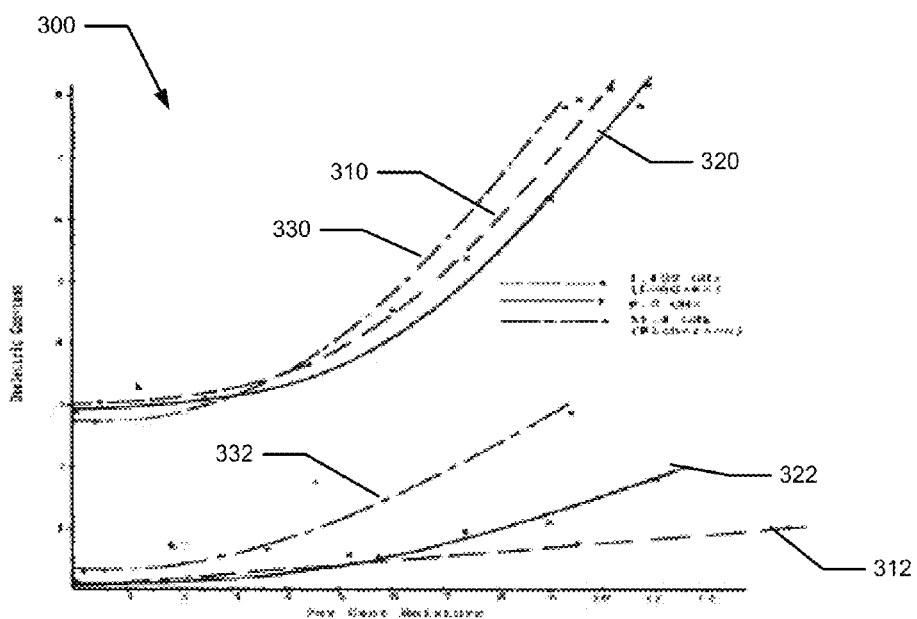
FIG. 3 is an example prior art plot of a dielectric constant versus soil moisture.
Figure 4:
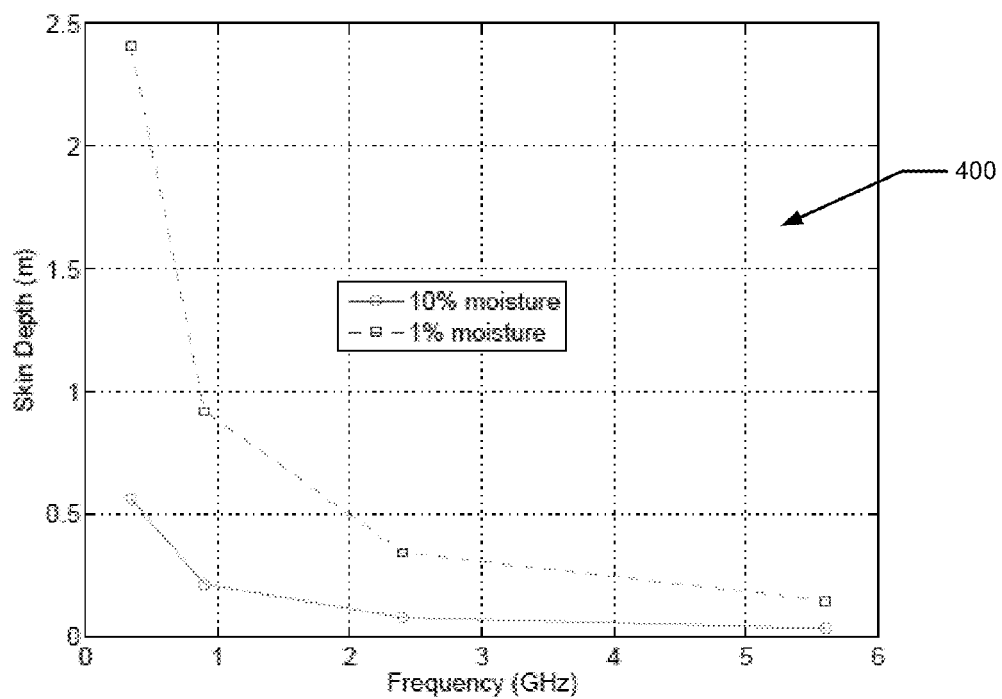
FIG. 4 is an example plot of depth versus frequency based upon the dielectric values of the example plot of FIG. 2.

The polarization-frequency signature represented by $\underline{S}_v(k)$ will be perturbed with changes in the multipath composition due to soil moisture content. To see this, it is noted that the polarization state of a signal reflected from a surface will depend upon several factors including (but not limited to) the complex dielectric constant of the soil state, the polarization state of the incident signal, and the angle of incidence. Example values 300 of complex dielectric constants for a particular soil are shown in FIG. 3 as a function of soil moisture level for three frequencies 1.4 GHz, 9 GHz, and 31 GHz. The upper set of curves (310, 320, and 330, respectively) correspond to the real part of the dielectric constant, and the lower set of curves (312, 322, 332, respectively) to the imaginary part. The measurements indicate increasing dielectric constant values with an increase in soil moisture. The changes in the dielectric properties of a soil with moisture directly impact the skin depth of signal penetration as well as the properties of reflected signal components. The skin depth is given by Eq. 6:

$$\delta = \frac{\lambda \sqrt{\varepsilon'}}{2\pi\varepsilon''} \quad \text{Eq. 6}$$

and is plotted 400 in FIG. 4 for the dielectric properties from FIG. 3 to illustrate the skin depths versus moisture level for various frequencies (900 MHz, 2.4 GHz, and 5.8 GHz). These skin depths correspond to the "layers" that are characterizes in depth profiles.

Figure 5:
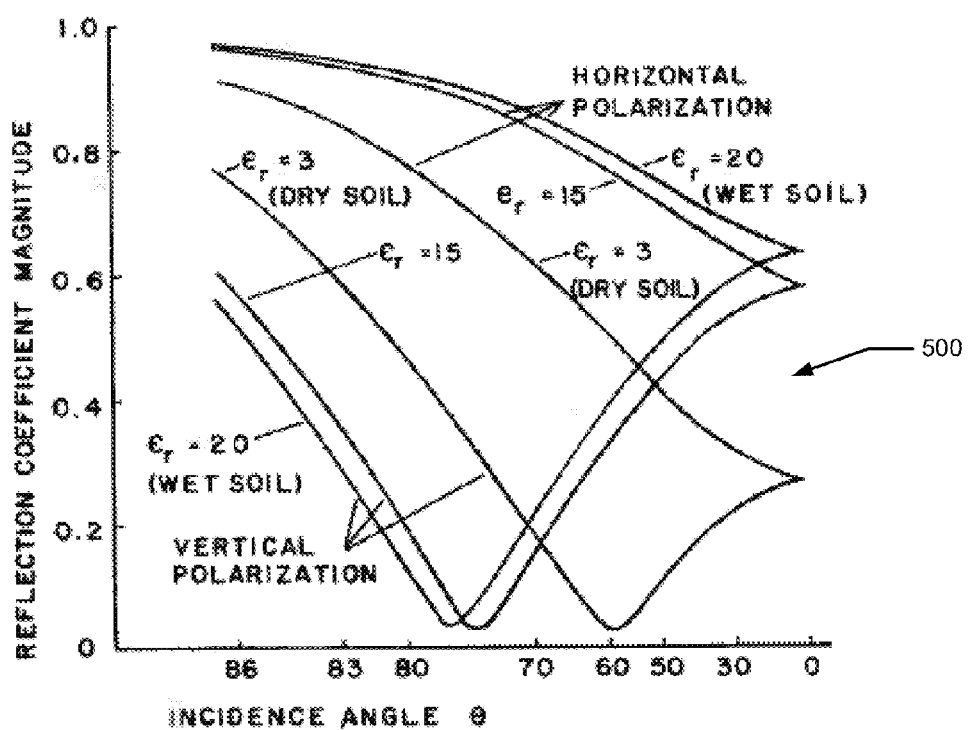
FIG. 5 is an example prior art plot of a reflection coefficient versus incident angle illustrating that different incident polarization components yield different reflection coefficient values versus soil moisture, changing the polarization state of the reflected signal.

Measured reflection coefficients 500 for vertically and horizontally polarized signals at different incidence angles are shown in FIG. 5 for different dielectric constant values. It is observed that the reflection coefficient strongly depends upon the incidence angle and is a maximum at normal incidence. It is also seen that as the soil moisture increases, the reflection coefficient corresponding to the V component is reduced, while the magnitude of the H component increases slightly. These changes, as well as associated changes in the phase, result in polarimetric changes in the reflected signal. Thus changes in soil moisture lead to physical changes that can be observed through polarimetric sensing.

As the reflective properties of the soil vary due to changes in moisture content, the received signal composition changes, and the polarization-frequency response also changes, evolving through a continuum of signatures as the moisture in the soil evaporates. In the example system 200, these changes in the polarization-frequency state are detected through minimum distance techniques to identify the calibrated state (measured during the calibration cycle) to which the current state is closest, where each calibrated state is associated with a specific soil moisture level. Assuming a total of M calibration states, $\Gamma_1 \ldots \Gamma_M$, where $\Gamma_m = \{S: S \in S_m(k), k \in \{0, 1, \ldots, K\}\}$ and $S_m(k)$ is a calibrated state, and correspond soil moisture levels $g_1, g_2, g_M$, the measure used to estimate the change between the current states, $\underline{S}_v(k)$, k=1, 2, . . . , K, and the calibrated states is given by Eq. 7:

$$Q_m = \sum_{k=1}^{k} |\underline{S}_v(k) - \underline{S}_m(k)|^2 \quad \text{Eq. 7}$$

$$m = 1, 2, \ldots, M$$

The estimated soil moisture state is selected to be the one corresponding to calibrated state that minimizes Q.

In one implementation of the example system 200, a series of instrumented laboratory-based experiments were conducted to illustrate the application of the RF sensing technology to soil moisture sensing. In this disclose example, the system 200 was used to detect the moisture content of trays of sand which were acting as the target object 216. The object 216 was wetted, and RF beacon signals from the transmitter 210 (e.g., an IEEE802.11b access point) were transmitted every 100 ms from an external antenna and were received by the receiver 214 (e.g., a second antenna deployed across from the transmitter antenna with the tray in between. The system was then utilized to measure changes in the polarization signatures of the beacon signals induced by the changing soil moisture levels and to correlate the RF response with the soil moisture estimates derived from capacitance probes used as a control. The beacon signals illuminated the objects and surfaces within the transmission field of view of the antenna, including the three trays of sand. At the receiver 214, a dual polarized antenna was used to collect the signals reflected from the trays and from other objects and surfaces in the vicinity and the signals were digitized using a digital sampling scope and stored on an external hard drive. The collected data were used to synthesize the RF polarimetric signatures.

By way of example, in one configuration, the example system 200 may utilize the following equipment.

TABLE 1

| Equipment | Manufacturer and Model |
|---|---|
| Wireless router | Cisco Aironet 1242AG-A |
| Transmit antenna | L3-Com dual polarized antenna HG2414DP-090 |
| Receive antenna | L3-Com dual polarized antenna HG2414DP-090 |
| Low noise amplifier | Mini-Circuits ZQL-2 700MLNW+ |
| RF filter | L3-Com, 2.4 GHz to 2.5 GHz inline filter |
| Digital sampling scope | Agilent Technologies DSQ94O4A |

In addition to the components shown in Table 1, four capacitance probes (EC-5) associated with a CR200 datalogger were also deployed in parallel sections of one of the sand trays. The purpose of these probes was to obtain multiple independent measures of the moisture of soil in the tray. The CR200 datalogger used in the tests was not configured to provide realtime measurement feedback, which is why the Decagon Procheck was used for a realtime indication of sensed soil moisture. In the disclosed example the capacitance probes were calibrated prior to utilization in playsand and an empirical calibration formula to convert the raw voltage output from the probes to the volumetric water content of sand (%) may be developed $\beta=-20.878+0.0694\times\alpha$, where $\beta$ is the converted value of volumetric water content of sand (%), and a is the voltage output from the capacitance probes. The calibration function was subsequently used to estimate the absolute soil moisture level from the measured evaporation cycle data.

The radio frequency receiver 214 collected RF signal snapshots each hour and digitized them for additional post-test signal processing to characterize the polarization-frequency response. The resulting signatures in combination with the CR200 measurements and the Decagon Procheck measurements were then used to assess the performance of the RF approach.

Specifically, in one example test conducted by the system 200, the testing consisted of two evaporation cycles. Prior to the application of water to the trays, the Procheck system was used to measure and confirm the dryness of the soil. To initiate the first cycle, four cups of water per tray were "uniformly" applied to the trays using a watering can, and then the trays were left undisturbed over a period of days while the water in the trays evaporated. Throughout the evaporation cycle, the four probes connected to the CR200 datalogger collected and stored capacitance-based data along with a time and date stamp. The RF receiver 214 collected snapshots every hour and stored these data for eventual post-processing. After approximately four days of collection the reading from the probe connected to the ProCheck meter indicated that that the soil had reached its original dryness state.

A plot 600 of the CR200 data collected during the first cycle are shown in FIG. 6, for each probe, where results are shown for the hourly samples that are time-synchronized with the RF measurements. The raw voltage data were converted into moisture estimates using calibration curves for playsand.

The RF data collected by the receiver were also processed to generate PMD signatures. Hourly signatures are illustrated in a plot 700 on a Poincare Sphere in FIG. 7. The signatures may be understood as representing the impact of the multipath reflections, including reflections from the soil, measured by the receiver. The signature at the output of the transmitter (prior to propagation) would be represented by a single polarization state on the Poincare sphere for all frequency components of the transmitted signal. The effects of the multipath, including from the soil, result in a dispersion of the polarization state as a function of frequency, where the resulting signature depends upon the composition of the multipath. A review of the plot 700 shows that the signatures are seen to evolve smoothly through a continuum of signature states beginning with the wettest state and ending with the driest state, both which are indicated. Note the ease with which the dry state can be discerned due to the clustering of signatures near the end of the cycle, indicating an important capability of the approach to provide cues when the soil is nearly dried out. The continuous change evidenced by the RF signatures during the evaporation process correlates well with the continuous change observed in the capacitance-based data. Each hourly signature is assigned with the corresponding time-synchronized soil moisture levels derived from the average of the calibrated CR200 measurements.

As illustrated in the plot 800 shown in FIG. 8, testing associated with a second evaporation cycle was also conducted, although with three cups of water per tray. For the second evaporation cycle, the same procedure was followed to collect both RF and capacitance-based data, and the experimentation was complete after the sand in the trays was dry. As noted, the RF data was processed to generate the PMD curves, sampled at an hourly rate, for the second evaporation cycle. The PMD curves in FIG. 8 map a similar evolution to the first cycle (FIG. 7) because each soil moisture state should yield a repeatable PMD signature. In fact, there is a high correlation between the curves in the plot 800 and the plot 700 in FIG. 7. The difference between the responses in the two cycles is most likely due to the difference in the distribution of the water in the trays that was realized between the cycles, which would lead to perturbations in the PMD curves from cycle to cycle.

Figure 9:
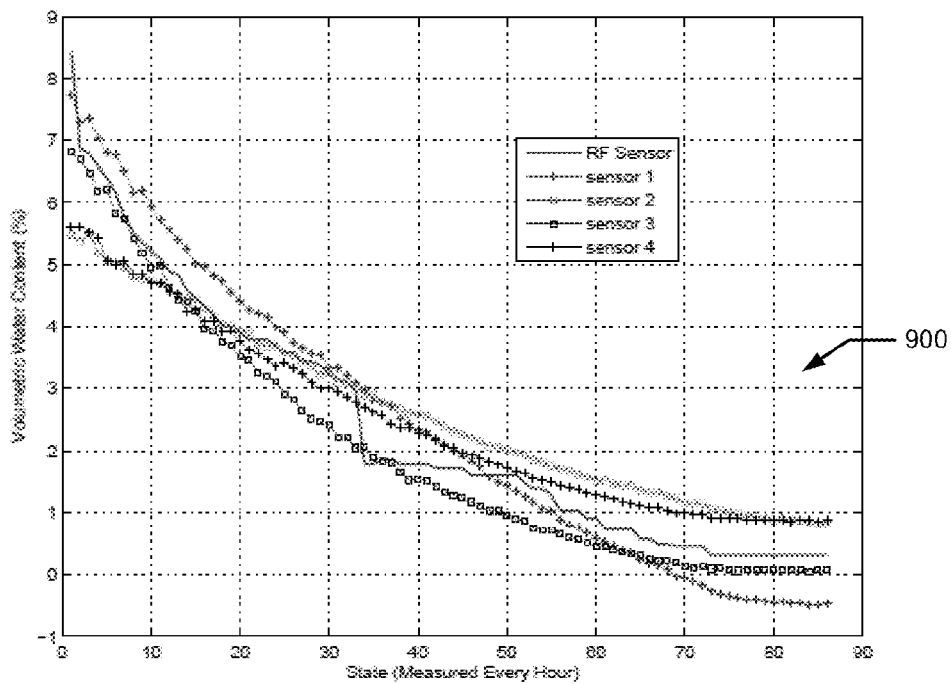
FIG. 9 is an example plot illustrating a comparison of radio frequency sensor soil moisture estimates as obtained from the system of FIG. 2 with capacitance probes embedded in the soil.

In assessing the performance of the polarimetric sensing technique performed by the system 200, it can be seen that the soil moisture can be accurately estimated using the RF calibrated states derived from the calibration evaporation cycle. Specifically, for each RF measurement in the second evaporation cycle, the soil moisture level is estimated by determining the PMD signature from the RF calibration cycle that is "closest" to the RF signature. The corresponding soil moisture level from the RF calibration is then used as the estimate. The soil moisture estimates derived in this fashion for the RF data in the second cycle to obtain "calibrated RF data" are then compared with the calibrated capacitance probe data from the second cycle. The calibrated RF data from the second cycle and the calibrated capacitance data from the second cycle are both plotted by plot 900 in FIG. 9. A comparison of the plotted data 900 shows that the resulting soil moisture estimates fall within the bounds defined by the four capacitance probe and indicates the ability of the RF sensing approach to provide accurate soil moisture measurements in controlled environments using calibration. As the soil nears the final dryout state, the changes in both the capacitance and RF systems exhibit very small changes and when the soil is dried out they exhibit virtually no change. The cue provided by reduced hourly changes in the RF sensor outputs can potentially be used in applications to indicate when the soil is approaching a dried out state.

It will be understood that in addition to a comparison with a calibrated standard, the system 200 may perform a comparison through any suitable comparative means. For instance, the measured PMD signatures may be compared between multiple receivers, may be compared with a calibrated look-up table of signatures, and/or may be compared to a reference state and/or a prior measurement to detect a relative change. Still further, the system 200 may detect changes based upon a time dependent behavior of the detected signatures, may compare signatures between multiple transmitters, and/or may compare the detected measurements with responses at other frequencies, beams, sectors, times, etc. In still other examples, the comparison may allow for detection based upon time dependent behavior of signatures, and/or may be utilized with prediction models to detect and/or predict future outcomes.

Figure 10:
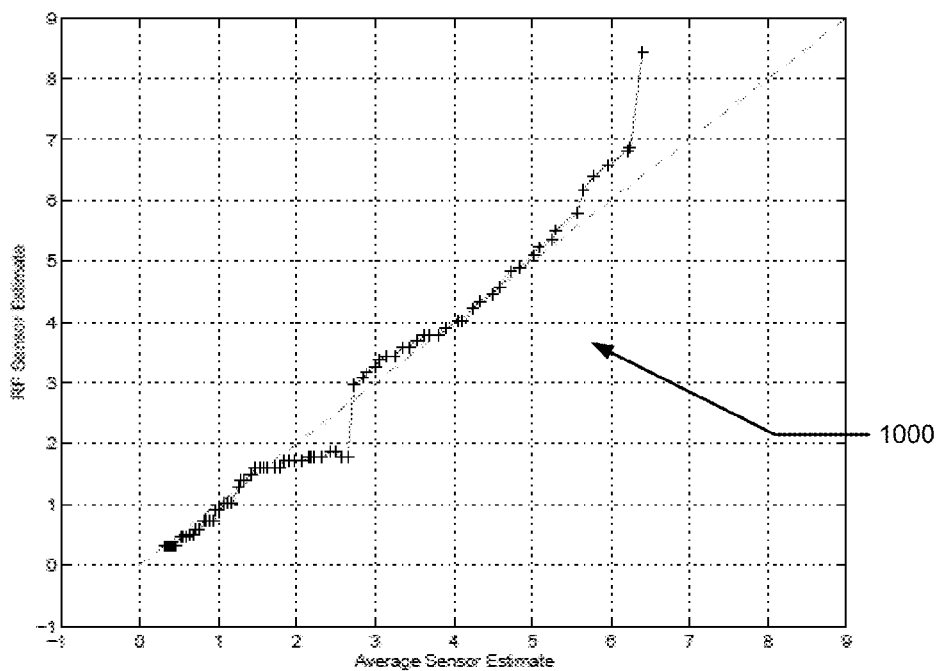
FIG. 10 is an example plot illustrating a comparison of the average capacitance probe response to the radio frequency sensor soil moisture estimates as obtained from the system of FIG. 2.

In this example, the correlation of the RF sensor to the average capacitance probe measurement is evidenced by a plot 1000 in FIG. 10, where perfect correlation (e.g., when the RF sensor output equals the average capacitance probe output) corresponds to responses on the dashed line. There is clearly a strong correlation between the RF sensor output and the average probe measurement.

Hence the RF approach disclosed herein is seen to provide a continuum of changing signatures, consistent with the changing soil conditions in the tray. A practical feature of the performance of the system 200 is that as the soil approaches a dried out state, the hourly change between signatures is small and then become negligible when the soil dries out, suggesting its use as a "drought trigger". Through a calibration procedure, where the measured signatures are assigned to specific soil moisture levels, it can be appreciated that soil moisture estimates can be achieved using the RF measurements that fall within the bounds defined by capacitance measurements. In other words, the measurements are entirely consistent with the capacitance probes, thus showing the effectiveness of the approach.

As noted above, the present example system 200 is disclosed as well suited for soil moisture sensing. In particular, maximizing water use efficiency in agricultural production is increasingly important in an era with increasing global water scarcity and climate change. Soil moisture measurements are a valuable tool for improving irrigation practices. However, there currently are no scalable, remote sensing methods to continuously measure soil moisture content and the present RF polarimetry system 200 may be considered a valuable and cost-effective tool to quantify changes in soil moisture content in real time. In some examples, the system 200 may be integrated into automated irrigation systems that can provide crops with the amount of water needed, when needed, thus benefiting both agriculture and society at large.

For example, the system 200 may be integrally used to develop more efficient irrigation practices, increasing the water use efficiency of crop production. More efficient water use also helps protect our water supplies, one of the most valuable natural resources, and will reduce leaching and runoff from agricultural fields. Because this leachate and runoff can contain fertilizer and pesticides, reducing leaching and runoff decrease the impact of agriculture on the surrounding environment.

While the system 200 is generally illustrated and described as being utilized for soil moisture sensing, it will be understood by one of ordinary skill in the art that the present system 200 may be utilized for various other applications.

As is previously described, the example system 200 may analyze and compare the polarimetric state of RF signals after their reflection from a given target such as the ground and/or soil. In other examples, the present system 200 may be adapted for use with other targets as well. For instance, the system 200 may similarly be utilized in a manufacturing process, such as the processing of food or food products, including processes dependent upon moisture content. More particularly, the present system 200 may by utilized in the drying of foodstuff such as coffee, barley, peanuts, rice, oats, grapes, etc. Use of the system 200 in this manner would replace the foodstuff as the target, and as such, RF signals reflected off these targets may be analyzed for their polarimetric state information to include in one instance PMD.

In another example, as noted above, the system 200 may be utilized to identify moisture and/or or detect other weather and/or other hydrometeor phenomenon such as rain, fog, sleet, snow, hail, clouds, and/or extreme weather. As such, in this example, the target 216 is the atmosphere.

Additionally, the system 200 may be utilized to identify and/or predict moisture and/or ice, such as for instance on a vehicle surface (e.g., ground vehicle, aircraft, wind turbine, airfoil and/or other wing surface), or ground conditions such as icy roads, etc.

Still further, the present system 200 may be utilized as ground penetrating radar by varying the signal 212 generated by the transmitter 210. For instance, a 400 Mhz signal may typically penetrate the ground approximately 10-15 feet, thus providing ground sensing capabilities beyond the surface soil moisture sensing provided. In this, and all disclosed examples, the system 210 may not rely solely upon a signal of opportunity (e.g., as in a passive system) but rather may generate the transmitted signal (e.g., as in an active system). Additionally, by varying the frequencies of the signal 212, various differing depth of the object 216 may be examined and correlated into a map providing a layered analysis of the target object 216. Additionally, the system 200 may be calibrated to locate different features within the target 216, such as improvised explosive devices (IEDs), structures, pipes, and/or any other item with a different reflection than the target object 216.

Still further, the present system 200 may be utilized to detect and/or identify food contamination by monitoring changes in the polarization mode dispersion behavior.

As noted above, the present system 200 may be utilized as ground penetrating radar. It will be appreciated by one of ordinary skill in the art that the system 200 may additionally be utilized as any number of types of radars, including, for example, synthetic-aperture radar (SAR). Furthermore, the present system 200 may be utilized to for signal detection and characterization, dehopping of frequency hopping systems, pulse/source associations including for PRI-agile, frequency-agile, PRF-agile, and waveform-agile systems (e.g. to support pulse deinterleaving), target feature detection, and/or target associations for distributed radar.

Still further, the system 200 may be utilized to monitor vibratory systems/events by detecting changes in the PMD response. In one example, the system 200 may be utilized to detect/predict failure analysis in bearings, machinery, etc. Additionally, structures such as buildings, bridges, etc, may be analyzed for vibratory events including failure detection, prediction, and/or analysis. Because the system 200 can detect vibrations, the system may also be utilized to identify voices, sounds, etc., though windows, walls, etc.

In still additional examples, the system 200 may be configured for medical purposes, including biometric measurements. In one instance, the example system 200 may be specifically used as a thoracic biometric heart monitor. In this occasion, the RF polarimetry is used to characterize for identification and monitoring by scattered, polarized RF signatures from the heat during respiration, and/or contraction and relaxation of the heart muscle. In this way a non-invasive biometric measurement may be obtained.

What's more, the present system 200 may be utilized to for interference suppression, such as in power line communications, wireless communication and radar, astronomy, other sensor systems, etc. In addition, the system 200, may be utilized for noise quality characterization based, communications with modulated polarization as an overlay.

Finally, the example system 200 may be utilized as a cybersecurity device. In this case, multiple modes occur in wireless, fiber optic, and power line conductors, and unique and/or distinguishable signatures may occur for each link. The system 200 can thus exploit this phenomenon to discriminate true networks clients in these electromagnetic media if the receivers at each demodulator retransmit point within a network carry the signal forward.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

I claim:

1. A method of identifying changes utilizing radio frequency polarization comprising:
   receiving dual-polarized components of at least a partially polarized radio frequency signal at a receiver, the radio frequency signal being at least one of reflected or transmitted through a target object;
   filtering the received signal;
   amplifying the received signal;
   conditioning the received signal;
   converting the received signal from an analog format to a digital format;
   processing the digital signal to elicit a polarization mode dispersion feature of the received signal; and
   detecting a change in a polarization response of the target object.

2. A method as defined in claim 1, wherein detecting a change in the polarization response of the target further comprises comparing the polarization mode dispersion features to a known calibration.

3. A method as defined in claim 2, wherein the known calibration is determined by measuring the polarization mode dispersion signature and comparing the measured polarization mode dispersion signature to a known standard measurement.

4. A method as defined in claim 1, wherein detecting a change in the polarization response of the target further comprises comparing the polarization mode dispersion features to a previously elicited polarization mode dispersion feature of the received signal.

5. A method as defined in claim 1, wherein detection of a change in the target object comprises detection of a change in moisture content.

6. A method as defined in claim 5, further comprising outputting the detected change in the target object moisture content.

7. A method as defined in claim 6, further comprising utilizing the outputted change in the target object moisture content to control irrigation of the target object.

8. A method as defined in claim 1, wherein detection of a change in a characteristic of the target object comprises detection of at least one of vibration, position change, attitude change, mechanical fault, electrical fault, electromagnetism, reflectivity, liquid phase, solid phase, structural change, or foreign object contamination of the target object.

9. A method as defined in claim 1, wherein elicitation of the polarization mode dispersion feature of the received signal comprises computing a Stokes Parameter versus a frequency index.

10. A method as defined in claim 1, further comprising visually mapping the polarization mode dispersion curves over time.

11. A method as defined in claim 2, wherein the known calibration is a predictive model and wherein comparing the polarization mode dispersion features to the known calibration allows for prediction of an impending change in the target object.

12. A method as defined in claim 1, wherein the received polarized radio frequency signal is a bistatic signal.

13. A method as defined in claim 1, further comprising receiving a second signal polarized radio frequency signal of a different frequency at the receiver, the second polarized radio frequency signal being at least one of reflected or transmitted through a target object;
   filtering the received second signal;
   amplifying the received second signal;
   conditioning the received second signal;
   converting the received second signal from an analog format to a digital format;
   processing the second digital signal to elicit a polarization mode dispersion feature of the received second signal; and
   comparing the polarization mode dispersion features of the received second signal to the polarization mode dispersion features of the signal to detect a change in a characteristic in the polarization response of the target object.

14. A method as defined in claim 1, further comprising receiving a second signal polarized radio frequency signal of a different frequency at the receiver, the second polarized radio frequency signal being at least one of reflected or transmitted through a target object;
   filtering the received second signal;
   amplifying the received second signal;
   conditioning the received second signal;
   converting the received second signal from an analog format to a digital format;
   processing the second digital signal to elicit a polarization mode dispersion feature of the received second signal; and
   comparing the polarization mode dispersion features of the received second signal to detect a change in a characteristic in the polarization response of the target object at a depth different than the first signal.

15. A method as defined in claim 1, further comprising:
measuring an external factor; and
compensating the processing of the digital signal based upon the measured external factor.

16. A method as defined in claim 15, wherein the external factor is temperature.

17. A system for identifying changes utilizing radio frequency polarization comprising:
a dual-polarized receiver for receiving a polarized radio frequency signal, the polarized radio frequency signal being at least one of reflected or transmitted through a target object;
a signal filter for filtering the received signal;
a signal amplifier for amplifying the received signal;
a signal conditioner for conditioning the received signal;
an analog to digital converter for converting the signal from an analog format to a digital format;
a processor for processing the digital signal to elicit a polarization mode dispersion feature of the received signal; and
wherein the processor detects a change in a characteristic of the target object.

18. A system as defined in claim 17, wherein the processor detects the change in a characteristic of the target response by comparing the polarization mode dispersion features to a known calibration stored in a memory.

19. A system as defined in claim 18, wherein the known calibration is determined by measuring the polarization mode dispersion signature and comparing the measured polarization mode dispersion signature to a known standard measurement.

20. A system as defined in claim 17, wherein the detected changes in the target object comprises detection of a change in moisture content.

21. A system as defined in claim 17, further comprising utilizing the outputted change in the target object moisture content to control irrigation of the target object.

22. A system as defined in claim 17, wherein detection of a change in a characteristic of the target object comprises detection of at least one of vibration, position change, attitude change, mechanical fault, electrical fault, electromagnetism, reflectivity, liquid phase, solid phase, structural change, or foreign object contamination of the target object.

23. A system as defined in claim 17, wherein elicitation of the polarization mode dispersion feature of the received signal comprises computing a Stokes Parameter versus a frequency index.

24. A system as defined in claim 18, wherein the known calibration is a predictive model and wherein comparing the polarization mode dispersion features to the known calibration allows for prediction of an impending change in the target object.

25. A system as defined in claim 17, wherein the received polarized radio frequency signal is a bistatic signal.

26. A method of identifying changes utilizing electromagnetic signal polarization comprising:
receiving dual-polarized components of at least a partially polarized electromagnetic signal at a receiver, the signal being at least one of reflected or transmitted through a target object;
converting the received signal from an analog format to a digital format;
processing the digital signal to elicit a polarization mode dispersion feature of the received signal; and
detecting a change in a polarization response of the target object.

* * * * *